US011682416B2

United States Patent
Ramos et al.

(10) Patent No.: US 11,682,416 B2
(45) Date of Patent: Jun. 20, 2023

(54) VOICE INTERACTIONS IN NOISY ENVIRONMENTS

(71) Applicant: INTERNATIONAL BUSINESS MACHINES CORPORATION, Armonk, NY (US)

(72) Inventors: Igor Ramos, Georgetown, TX (US); Marc Dickenson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 879 days.

(21) Appl. No.: 16/054,810

(22) Filed: Aug. 3, 2018

(65) Prior Publication Data

US 2020/0043519 A1 Feb. 6, 2020

(51) Int. Cl.
*G10L 25/84* (2013.01)
*G10L 21/0208* (2013.01)
*G10L 15/22* (2006.01)
*G10L 15/18* (2013.01)
*G10L 15/26* (2006.01)

(52) U.S. Cl.
CPC .............. *G10L 25/84* (2013.01); *G10L 15/18* (2013.01); *G10L 15/22* (2013.01); *G10L 15/26* (2013.01); *G10L 21/0208* (2013.01)

(58) Field of Classification Search
CPC ......... G10L 15/18; G10L 15/22; G10L 25/84; G10L 15/26; G10L 21/0208; G10L 2015/223
See application file for complete search history.

(56) References Cited

U.S. PATENT DOCUMENTS 5,740,318 A 4/1998 Naito et al.
7,574,358 B2 * 8/2009 Deligne ................ G10L 15/065
704/243

(Continued)

FOREIGN PATENT DOCUMENTS

WO 2017091883 A1 6/2017

OTHER PUBLICATIONS

Suendermann, D., Advances in Commercial Deployment of Spoken Dialog Systems, Springer Science & Business Media, Technology & Engineering, Jun. 2011, 79 pg.

*Primary Examiner* — Michael N Opsasnick
(74) *Attorney, Agent, or Firm* — Cuenot, Forsythe & Kim, LLC (57) ABSTRACT

Providing contextual help in an interactive voice system includes receiving a plurality of user interaction events during a user interaction window, wherein each of the user interaction events comprises one of a low quality voice transcription event from a speech-to-text (STT) service or a no-intent matching event from a natural language processing (NLP) service and receiving a respective transcription confidence score from the STT service for each of the plurality of user interaction events. For a one of the plurality of user interaction events, a determination is made of how to respond to a user providing the user interaction events based on how many events comprise the plurality of events and the transcription confidence score for the one event; and then instructions are provided to cause the determined response to be presented to the user in accordance with the determination of how to respond.

20 Claims, 4 Drawing Sheets

(56) References Cited

U.S. PATENT DOCUMENTS

| | | |
|---|---|---|
| 8,478,780 B2 | 7/2013 | Cooper et al. |
| 8,694,335 B2* | 4/2014 | Yegnanarayanan .... G16H 10/60 |
| | | 705/2 |
| 9,117,460 B2 | 8/2015 | Lahti |
| 9,472,185 B1 | 10/2016 | Yeracaris et al. |
| 9,620,128 B2 | 4/2017 | Levien et al. |
| 2006/0149544 A1 | 7/2006 | Hakkani-Tur et al. |
| 2011/0307241 A1* | 12/2011 | Waibel .................... G06F 40/58 |
| | | 704/2 |
| 2013/0297290 A1* | 11/2013 | Bostick ................. G06F 40/242 |
| | | 704/9 |
| 2013/0297291 A1* | 11/2013 | Bostick ................. G06F 40/268 |
| | | 704/9 |
| 2014/0032217 A1* | 1/2014 | Deligne ................. G10L 15/065 |
| | | 704/257 |
| 2014/0344718 A1* | 11/2014 | Rapaport ................ H04L 51/32 |
| | | 715/753 |
| 2016/0133247 A1* | 5/2016 | Bostick ................. G06F 40/157 |
| | | 704/235 |
| 2016/0148610 A1 | 5/2016 | Kennewick, Jr. et al. |
| 2016/0284342 A1* | 9/2016 | Bostick ................. G06F 40/226 |
| 2017/0116979 A1* | 4/2017 | Bostick ............... G10L 15/1822 |
| 2018/0270350 A1* | 9/2018 | Engelke ............ H04M 3/42391 |

* cited by examiner

VOICE INTERACTIONS IN NOISY ENVIRONMENTS

BACKGROUND

The present invention relates to speech recognition, and more specifically, to improving speech recognition in noisy environments.

Noisy environments can make computer-based speech recognition more difficult and more prone to error. Examples of noisy environments can include background conversations or chatter in a conference, a party or in an office. Other examples of noisy environments can include coughing, clearing a throat, sounds like "um" and "ah" from a user, background noises such as a fan or shutting a door, and audio from other electronic devices. A voice recognition system may pick up background noises and may act upon an unintended command.

SUMMARY

A computer-implemented method includes receiving, by a processor, a plurality of user interaction events during a user interaction window, wherein each of the user interaction events comprises one of a low quality voice transcription event from a speech-to-text (STT) service or a no-intent matching event from a natural language processing (NLP) service; receiving, by the processor, a respective transcription confidence score from the STT service for each of the plurality of user interaction events; for a one of the plurality of user interaction events, determining, by the processor, how to respond to a user providing the user interaction events based on how many events comprise the plurality of events and the transcription confidence score for the one event; and providing, by the processor, instructions to cause the determined response to be presented to the user in accordance with the determination of how to respond.

A system includes a processor programmed to initiate executable operations. In particular, the operations include receiving a plurality of user interaction events during a user interaction window, wherein each of the user interaction events comprises one of a low quality voice transcription event from a speech-to-text (STT) service or a no-intent matching event from a natural language processing (NLP) service; receiving a respective transcription confidence score from the STT service for each of the plurality of user interaction events; for a one of the plurality of user interaction events, determining how to respond to a user providing the user interaction events based on how many events comprise the plurality of events and the transcription confidence score for the one event; and providing instructions to cause the determined response to be presented to the user in accordance with the determination of how to respond.

A computer program product which includes a computer readable storage medium having program code stored thereon. The program code is executable by a data processing system to initiate operations including: receiving, by the data processing system, a plurality of user interaction events during a user interaction window, wherein each of the user interaction events comprises one of a low quality voice transcription event from a speech-to-text (STT) service or a no-intent matching event from a natural language processing (NLP) service; receiving, by the data processing system, a respective transcription confidence score from the STT service for each of the plurality of user interaction events; for a one of the plurality of user interaction events, determining, by the data processing system, how to respond to a user providing the user interaction events based on how many events comprise the plurality of events and the transcription confidence score for the one event; and providing, by the data processing system, instructions to cause the determined response to be presented to the user in accordance with the determination of how to respond.

DETAILED DESCRIPTION

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

As mentioned earlier, noisy environments can make computer-based speech recognition more difficult and more prone to error. Examples of noisy environments can include background conversations or chatter in a conference, a party or in an office. Other examples of noisy environments can include coughing, clearing a throat, sounds like "um" and "ah" from a user, background noises such as a fan or shutting a door, and audio from other electronic devices. A voice recognition system may pick up background noises and may act upon an unintended command. In other instances, the system may erroneously recognize what was spoken and reply with an unhelpful or incorrect response.

Some current approaches to addressing this problem involve the voice recognition system simply asking the user to "please repeat" the command or utterance, which can be annoying especially when done so repeatedly. In general, the background noise or other sounds should be recognized as not part of the conversation and do not contribute to correctly analyzing a user's intended conversation. Therefore, it would be beneficial to improve the user's experience in the human-machine interactions when "no intent" is determined due to a low signal-to-noise ration in the audio signals detected by the voice recognition system.

Embodiments in accordance with the present disclosure address real-world challenges encountered while using systems that can perform speech-to-text (STT), natural language processing (NLP), and other voice or dialog recognition tasks. Ideally there would be no noisy background, but in the real world applications this is rarely the case embodiments in accordance with the present disclosure address this issue. In general, these embodiments provide users with better contextual help throughout the human-machine conversation by analyzing the STT and NLP data. As is known, STT typically contains confidence scores for the text transcription, along with alternate transcriptions. Also, NLP confidence levels can be used in matching text with intent. In a conventional system, STT does the end-of-speech detection and the detected speech is then passed to NLP to determine intent. The presently described embodiments leave the user interaction open until NLP finds an intent match or for a few extra seconds. One resulting benefit is better user experience in situations where a voice system (STT, NLP, and Dialog) fails to determine a clear intent. As a result, when there is low confidence in the speech recognition, the user can be provided a better overall experience, either by contextual help or deferred action (e.g., a cough should not trigger a new voice prompt).

Figure 1:
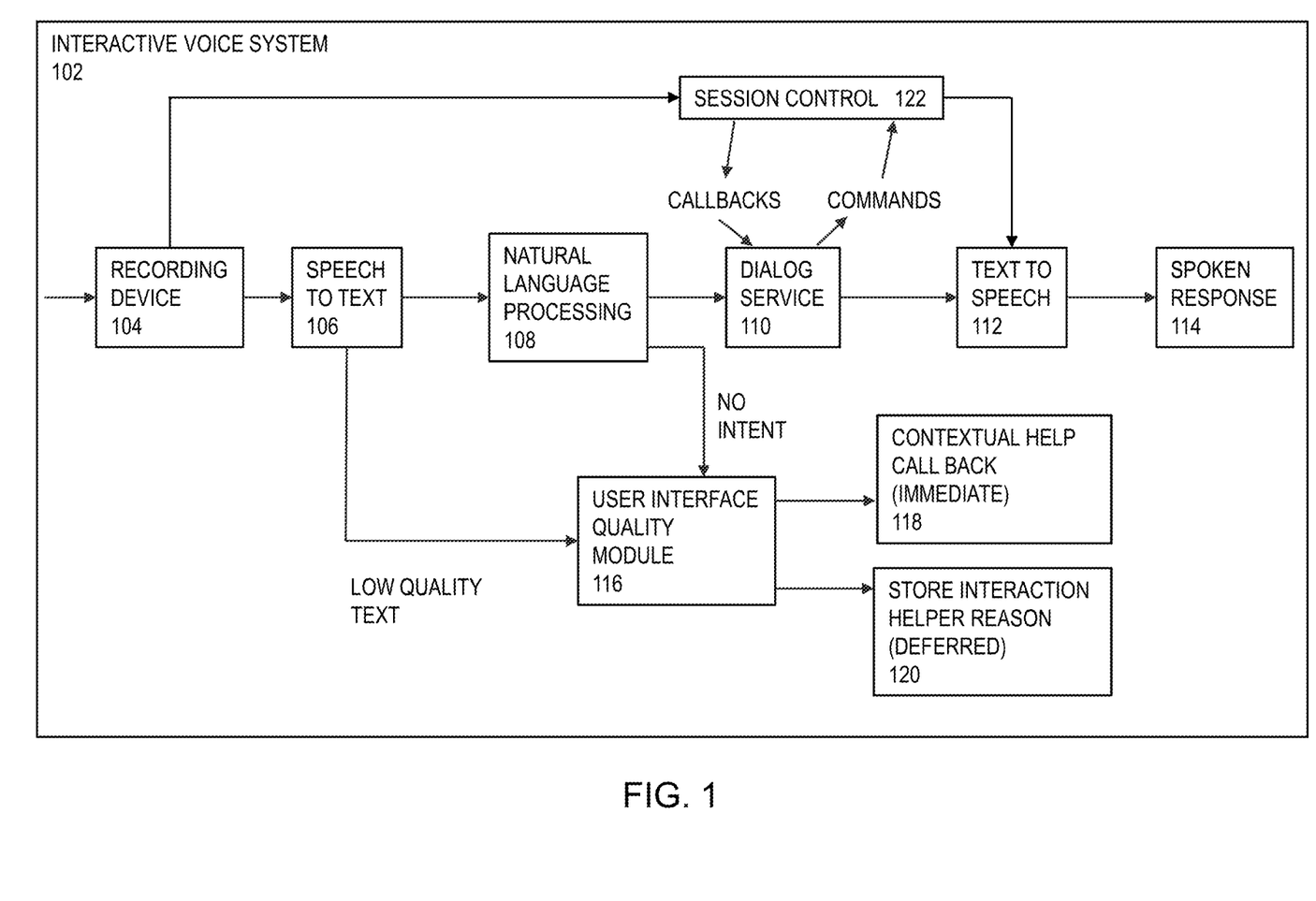
FIG. 1 is a block diagram of an interactive voice system in accordance with the principles of the present disclosure.

FIG. 1 is a block diagram of an interactive voice system 102 in accordance with the principles of the present disclosure. An utterance, noise, speech, or other audio data is represented by the incoming arrow to the recording device 104. Typically, the signal into the recording device 104 is generated by a microphone or similar transducer or sensor. The recording device 104 can then provide the information to a speech-to-text (STT) service 106 which can take an audio stream and produce output such as a JSON metadata, for example, of transcribed text alternatives and their respective confidence levels. The audio stream and resulting output from the STT service 106 can be comprised of "events" that occur during a user's interaction window with the interactive voice system 102.

In accordance with the principles of the present disclosure, there are two paths that the system 102 can take based on the results of the STT service 106. The path to the natural language processing (NLP) service 108 is likely the more common path and is followed when the confidence in the text is not very low. Thus, the output from the STT service 106 can be provided to the NLP service 108 which can then cross reference input text with a corpus and output the user's likely intent with corresponding confidence levels. The NLP 108 service can also perform grammar construction and confidence that the grammar construction forms a well-structured sentence.

There are two possible paths that the system 102 can follow based on the operation of the NLP service 108. The path to the dialog service 110 is likely to be followed more often and represents when the confidence in the user's intent determination is not too low. As is known, a dialog, or conversation, service 110 can consume intents and parameters in order to output elaborate response sentences along with machine commands to be performed by external third party services via APIs. The dialog service 110 can also consume callbacks in order to generate responses that may not be directly triggered by the user, but by an external source. From there, the output from the dialog service 110 can be provided to a text-to-speech (TTS) service 112 so that a spoken response 114 can be output. Also, session control 122 is the typical 'glue logic' in an interactive voice system that coordinates all the voice system components, such as performing turn management (i.e., making it clear whose turn is to speak).

Embodiments in accordance with the present disclosure include a "User Interface Quality Module" (UIQM) 116. There are two paths by which the system 102 can reach the UIQM 116. First, the UIQM 116 can consume events that are often discarded by the STT, for containing low-quality text. As an example, low quality text can be test for which the STT 106 has assigned a confidence score of 10% or less. The STT output can provide confidence levels, for example, between 0 and 1, and can set a threshold to drop transcription events so they do not even reach the NLP 108. For example, the STT 106 could drop all transcriptions with a 0.1 or below confidence. However, in the system 102 of FIG. 1, these low quality text events can still be provided to the NLP service 108 but can also be provided to the UIQM 116. Another data that the UIQM 116 can consume are NLP outputs with 'no intent found'. As mentioned above, in a typical voice system, a 'no intent found' automatically triggers a 'what did you say' prompt, or possibly the contextual prompt 'did you say yellow or blue' when asking for the user to choose colors, for example. As explained below, the UIQM 116 can forgo such a response by beneficially recognizing that a 'no intent found' may actually be background chatter or noise, such as a person coughing and will prevent immediate re-prompting or interruption of the user. In other words, the UIQM 116 can consume the low-quality results from STT and NLP—which is often discarded data—and, instead, perform processing of that data to improve the performance and accuracy of interactive voice systems. With improved accuracy, less interruptions, and less repeating of responses, the speed at which the system 102 can provide a useful conversation or dialog is improved.

The result of the UIQM 116 may be immediate or may be deferred (or delayed). For example, if a user coughs while making an enquiry or providing a command, then an immediate contextual help callback 118 can be generated such that the dialog service 110 could ask "Did you just cough?". Alternatively, the UIQM 116 can probabilistically determine what likely happened (e.g., previous interactions with similar characteristics were determined to be the user coughing) and defer or delay a response 120 until the user's intent can be determined more accurately by the NLP service 108 or the user's interaction window expires.

Figure 2:
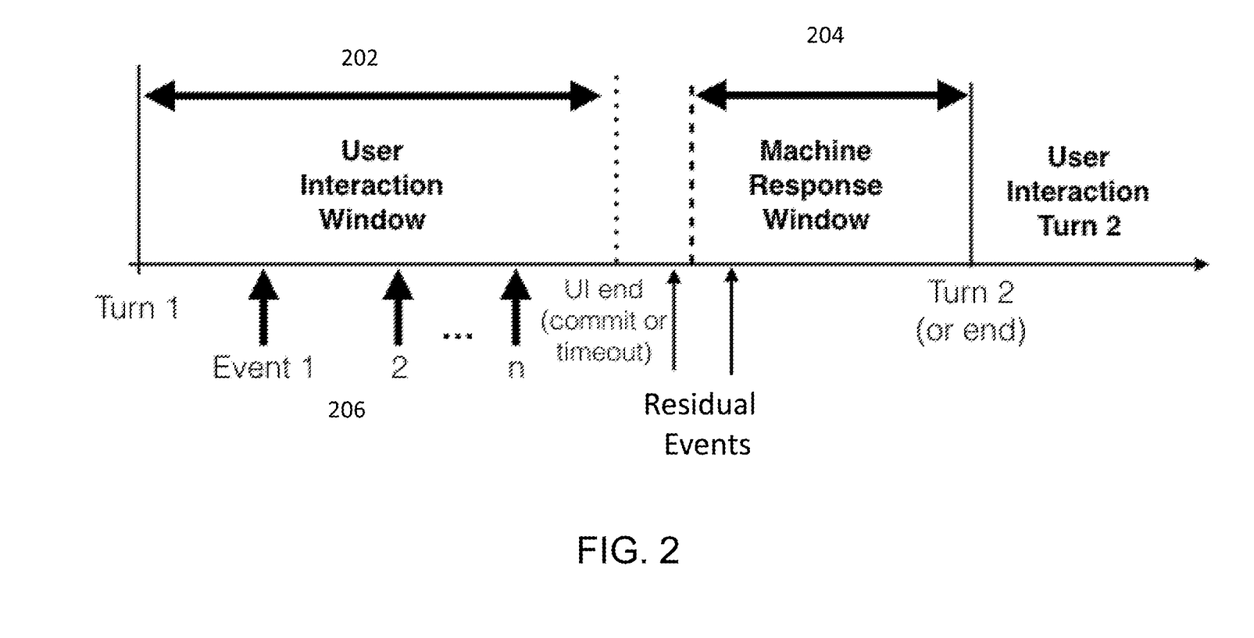
FIG. 2 is an example timeline of speech-to-text (STT) events that can occur in accordance with the principles of the present invention.

FIG. 2 is an example timeline of speech-to-text (STT) events that can occur in accordance with the principles of the present invention. For example, STT events can arrive and when there's a "no-intent" match in user's input by the NLP service 108, the UIQM 116 can look at supporting parameters such as, for example, a number of words spoken, a transcription confidence, a no-intent match event count during the user talk window, etc. as inputs to the processing algorithm. The interaction between the user and the interactive voice system 102 includes a user interaction (UI) window 202 that starts upon speech being detected and can end after a fixed time period or after the user is quiet for a predetermined time period. During the UI window 202 a number of events 206 can occur. Events 206 are separated by pauses in the user's speech (e.g., the end of a sentence) and can be processed and analyzed individually by the STT service 106, the NLP service 108 and the UIQM 116. After the UI window 202 ends, the machine response window 204 begins in which the interactive voice system 102 provides a response to the user.

The table below shows an example algorithm that the UIQM 116 could implement to determine how to proceed with the speech transcription that the STT service 106 provides to the dialog service 108. For example, when confidence level is low and a word count is low, the algorithm can defer the action, meaning: do not prompt user and wait for more events to come in or wait for the user interaction window to time out or expire. For example, the word count for a particular event may be low (e.g., 1 or 2) and while that information is useful, the average word count for all of the events analyzed by the UIQM 116 can be calculated and prove even more helpful. If the event count is relatively high and the average word count is low (e.g., 1 or 2), then this is evidence of a number of events that have a low word count. The input data identified in the table is provided by way of example only and the interactive voice system 102 can utilize other outputs produced by the STT service 106 or the NLP service 108.

| QUALITY SCORE | | | | | |
| --- | --- | --- | --- | --- | --- |
| INPUT DATA | | | | DECISION | |
| Rule | Confidence | Word Count | Event Count | When | Feedback (Hypothesis) |
| if | >90% | -x- | -x- | now | callback context help |
| else | -x- | -x- | >5 | now | callback inform chatter |
| else | >70% | -x- | <5 | defer | reason -- confirm |
| else | >30% | -x- | <5 | defer | reason - speak up |
| else | >10% | -x- | -x- | defer timeout | callback timeout {top reason} |

In the above table, the cells with an "-x-" can be a threshold value that is not considered or can be a threshold value than a machine learning algorithm continues to adapt with feedback from interactions with a user.

As each event reaches the UIQM 116, the algorithm of the above table can be used to determine how the UIQM 116 will cause the system 102 to interact with the user. For example, when a user is asked whether they want the red shoes or the white shoes, the user may respond with "I would like to have the blue shoes." In this instance, the NLP service 108 can determine the user's intent in response to the question cannot be determined but the UIQM 116 may realize there is a very high confidence in the transcription of the user's speech. Thus, the first line of the above table is satisfied and a contextual callback can be made immediately such as "Blue shoes are not an option in this case". This is an instance in which the actual language of the user reveals the user's intent, but from a conversation perspective the system can not determine the user's intent and, thus, is considered a 'no intent' determination.

The second line of the table is satisfied when a large number of events (e.g., >5) have already occurred in the current UI window. In particular a large number of events that were considered 'no-intent' events. In this case, the likely cause is background conversations or a television broadcast. Thus, a callback can be made immediately to prompt the user to move to a quieter location. If the word count for the present UI window and the event count for the present UI window are similar, then there are a lot of short events being detected and provided to the UIQM 116. Such an occurrence provides even more evidence that the user is likely in a noisy environment. The number of events in the event count cell can, for example, be the total number of event that have either been low quality or 'no-intent' matches during the current UI window.

The next three lines can defer or delay an immediate prompt or callback to the user. If, for example, there is some level of confidence in the speech transcription (either for this particular event or a running confidence for the present UI window), then the UIQM 116 can delay responding and wait for a few more seconds (e.g., about 1 or 2 seconds) before making a callback. The callback may for example be one to 'confirm' what the NLP service 108 determined the user to say. Another example is that the appropriate callback that is deferred may be to ask the user to speak louder. Eventually, the UI window will expire or timeout and a callback can be made based on one of the reasons determined earlier for delaying the callback based on the one or more events. In this way, events that may not allow a user's intent to be determined may not immediately result in an interruption or prompt being generated by the interactive voice system. Furthermore, the contextual help that is provided in a callback during a conversation may be improved by waiting for additional events to occur during the UI window.

Below are a number of examples that help explain an example UIQM and processing algorithm in accordance with the principles of the present disclosure.

Example 1A (All Uttered Inside UI Window)

| | |
| --- | --- |
| [User] | |
| "hey Watson, can you please play" | (event1) |
| "cough" | (event2) |
| "The Christmas Song" | (event3) |
| [Watson] | |
| ok, I'll be playing The Christmas Song | |

In this example there are 3 events within the UI window. The NLP service 108 finds it is high quality speech/text but finds "no intent" after the first event so there is no callback needed which results in deferral of action within the UI window. The second event is likely to be considered a low quality speech/text event which again results in a deferral of action. The third event is a high quality speech/text. The NLP service 108 can now consider both the first and third events in combination to find the user's overall intent. As a result, a callback can be added to the session to confirm the intent with user.

Example 1B (All Uttered Inside UI Window)

| | |
| --- | --- |
| [User] | |
| "hey Watson, can you please play" | (event1) |
| "cough" | (event2) |
| "cough" | (event3) |
| [Watson]: | |
| What song do you want me to play? | |

In this example there are 3 events within the UI window. The NLP service 108 finds it is high quality speech/text but finds "no intent" after the first event so there is no callback needed which results in deferral of action within the UI window. The second event is likely to be considered a low quality speech/text event which again results in deferral of action. The third event is also low high quality speech/text. The system (e.g., UIQM 116) builds a callback based on NLP for the first event.

Example 2 (Third Event Uttered Outside the UI Window)

| [User] | |
|---|---|
| "hey Watson, can you please play" | (event1) |
| "cough" | (event2) |
| - UI Window Expires - | |
| - Machine Response Window Starts - | |
| "The Christmas Song" | (event3) |
| [Watson]: | |
| What song do you want me [3rd event changed outcome]... ah ok, playing the Christmas Song. | |

In this example there are two events within the UI window and one event outside the UI window. The NLP service 108 finds it is high quality but finds "no intent" after the first event so there is no callback needed which results in deferral of action within the UI window. As above, the second event is considered low quality. After the machine response window starts to build a callback that reflects no intent was found, the third event (high quality speech/text) comes in. The NLP service 108 can now consider both the first and third events in combination to find the user's overall intent. If the interactive voice system 102 has not yet responded with "I could not understand the request, please repeat" based on first two events, then the planned response is modified with a callback to confirm intent based on the two response windows. Otherwise, the system 102 continues with the planned response based on first two events. Thus, the system (e.g., the UIQM 116) can modify a planned response when the user interrupts during the machine response window if intent can be determined based on the events of a previous UI window.

Example 3 (All Uttered Inside UI Window)

| [User] | |
|---|---|
| "hey Watson" | (event1) |
| "gold" | (event2) |
| indecipherable | (event3) |
| yes | (event4) |
| indecipherable | (event5) |
| indecipherable | (event6) |
| [Watson]: I'm here, but I could not understand you, there is too much background noise, can you go to a quieter spot and try again? | |

In this example, there are six events and all of them have a short word count (e.g., 1 or 2). This result from the example algorithm in the above table would be that it is determined that there is a lot of background noise so the user should change locations and the appropriate callback is constructed. This callback can happen immediately and is not necessarily deferred.

Example 4 (Some Events Uttered Inside UI Window; Some after)

| [User] | |
|---|---|
| "hey Watson" | (Event1) |

| | |
|---|---|
| "gold" | (event2) |
| indecipherable | (event3) |
| "yes" | (event4) |
| indecipherable | (event5) |
| indecipherable | (event6) |
| -- UI window expires - | |
| -- Machine Response Window Starts - | |
| indecipherable | (event7) |
| "hello" | (event8) |
| indecipherable | (event9) |
| indecipherable | (event10) |
| [Watson]: | |
| (no response due to ongoing background noise) | |

Compared to Example 3, this example has 10 events with low word count so there is even a higher confidence of extreme background noise because events continue even while it is the machine's "turn" to respond. Another value of this example is a mechanism for the machine to choose to not interrupt a conversation that humans are having in the background at an appropriate time as can often be the case. Thus, the machine's behavior can resemble "politeness".

As mentioned above, the correct settings or threshold values for the processing algorithm used by the QUIM 116 can be determined by use of machine learning which helps determine the correct correlation between the inputs and the best output. The thresholds can be improved, dynamically or not, according to system capability, application preferences and environmental conditions. Examples of aspects that can affect threshold determination include a) a system may be capable of identifying a speaker (with certain confidence) and source of sound (direction) (with certain confidence). It could then be set to ignore audio commands originating from the TV/Radio, and from unknown persons (e.g., prevent a visitor to your house to use your Voice Assistant); b) a system may be capable of discerning between command-style utterances (with certain confidence) from a dialog or reading from a text (or teleprompter). The latter utterances can be ignored or given lower priority when determining what the user is saying. These system capabilities could be implemented with voice/audio alone or by auxiliary means such as a camera performing presence detection, face detection or face recognition. This would help to determine if speech is coming from a user standing in front of the voice system user or if it is coming from a background source—TV, radio. Also, eye detection can be used to infer intent—that is, if a user is looking at voice system while issuing a command, the voice system then has higher confidence that the user wants to talk to it. Mouth movement detection/lip reading can further augment this approach. Additionally, the system can have a preference setting that can be set to accept commands from one (or few) known speakers or to accept commands from for any user. Such settings can produce beneficial results for known speakers as the system can be trained for that user's speech patterns and pronunciations. Also, a system that operates in a quiet office and is moved to a noisy conference floor, or windy day can have thresholds adjusted to compensate for signal-to-noise degradation. A similar adjustment can be made if there is an increase in the number of speakers in an environment.

Figure 3:
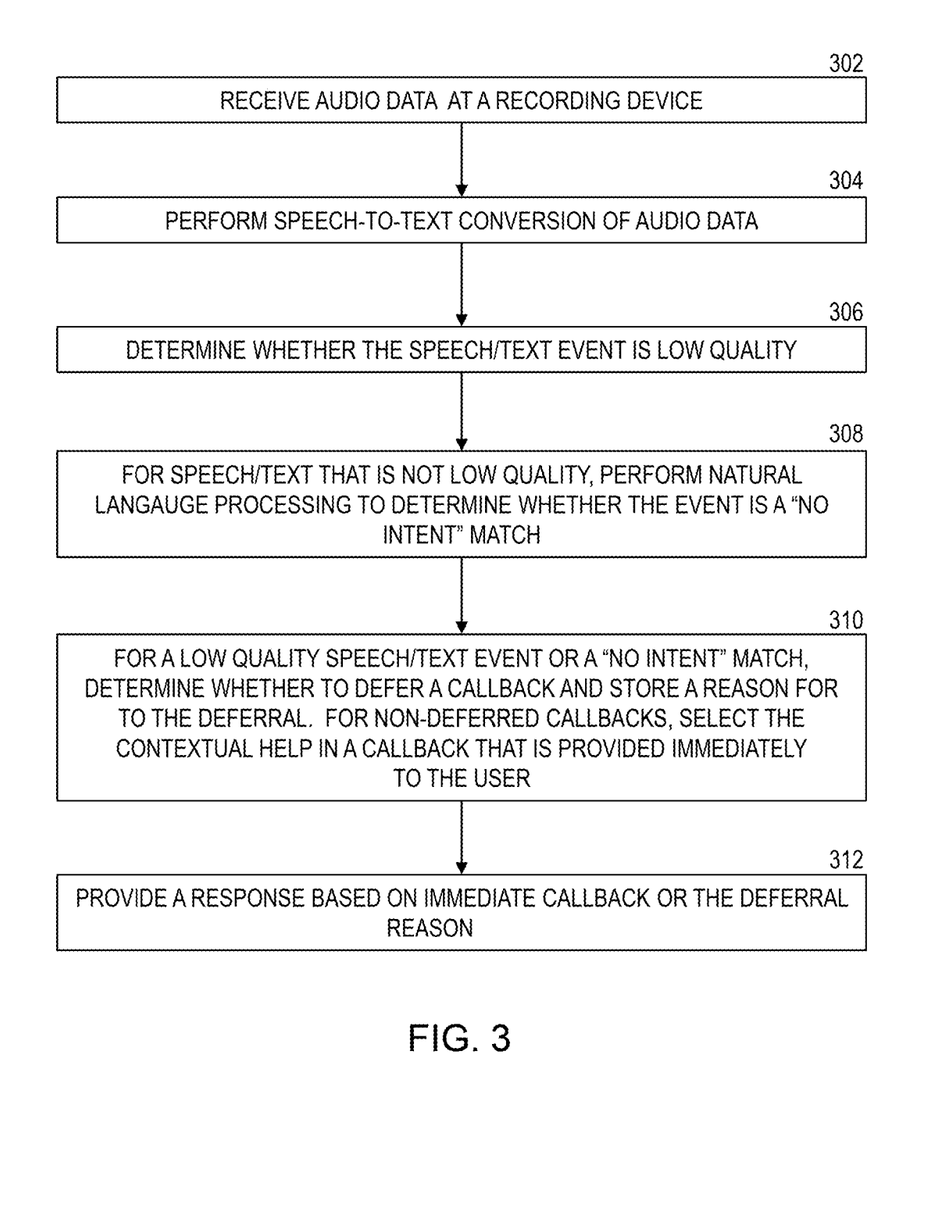
FIG. 3 is a flowchart of an example method for improving interactive voice systems in accordance with the principles of the present disclosure.

FIG. 3 is a flowchart of an example method for improving interactive voice systems in accordance with the principles of the present disclosure. In step 302 audio data is received by a recording device and provided to a STT service such that the STT service, in step 304, produces a transcription of the received audio data. The audio data is, for example received during a user interaction (UI) window that is part of an interactive voice system or device. The transcription can be comprised of a number of separate events. Speech in which there is little pause between words is considered a single event but when there is a pause between words, phrases, or utterances, that extend past what is typically found in average or normal conversation, each such utterance is considered an event. The STT service can provide, as output, a list of possible transcriptions and a respective confidence value for each. In step 306, the STT service can determine that the transcription is of such low quality (e.g., <10%) that the event should be handled differently than other events. Thus, in step 308, the speech that is not of low quality is processed by an NLP service to determine whether or not the user's intent can be determined. Those events that are a "no-intent" matches or of low quality are processed separately in step 310. Otherwise, high quality and "intent" matches are processed by a dialog service which provides an appropriate response to the user.

In step 310, those events are analyzed to determine whether to defer a callback or to issue one immediately. The term "immediately" is relative and is not intended to mean "instantaneously". The deferred callbacks are delayed for about 1 to 2 seconds to determine if further events occur during the UI window. The immediate callbacks are processed using normal and typical dialog features of the interactive voice system and occur during a machine response window.

An algorithmic process is utilized in step 310 to determine how to process the events and provide contextual feedback to a user. The NLP data for the current UI window such as, for example, the number of events that are "no-intent" matches, the transcription confidence score for an event from the STT service, and the number of low quality events from the STT service can be considered in combination to determine whether to defer a callback and the reason for deferring the callback. The UIQM, discussed earlier, can interact with one or more of the functional blocks of FIG. 1 (e.g., session control, NLP service, dialog service) to generate or send instructions that will cause a response to the user in accordance with the determination in step 310 of how that response should be made. Thus, in step 312, a response can be provided based on the immediate callback or the deferred callback as well as the reason for those callbacks.

As one alternative to the example system illustrated in FIG. 1 and described above, the UIQM 116 could be used between the NLP service 108 and the dialog service 110 and serve as a gatekeeper even if "intent" is found by the NLP service 108. Based on the additional context about word count, event counts, etc. the UIQM 116 could use its broader context knowledge to potentially edit, block or defer dialog responses from being spoken. A reservation system 112 may be part of the system 120 and allows a passenger to book a travel itinerary that includes at least a departure location and a destination location. Prior to arriving at the departure location, or once the passenger arrives at the departure location, the passenger can receive a token that electronically stores the itinerary information.

Figure 4:
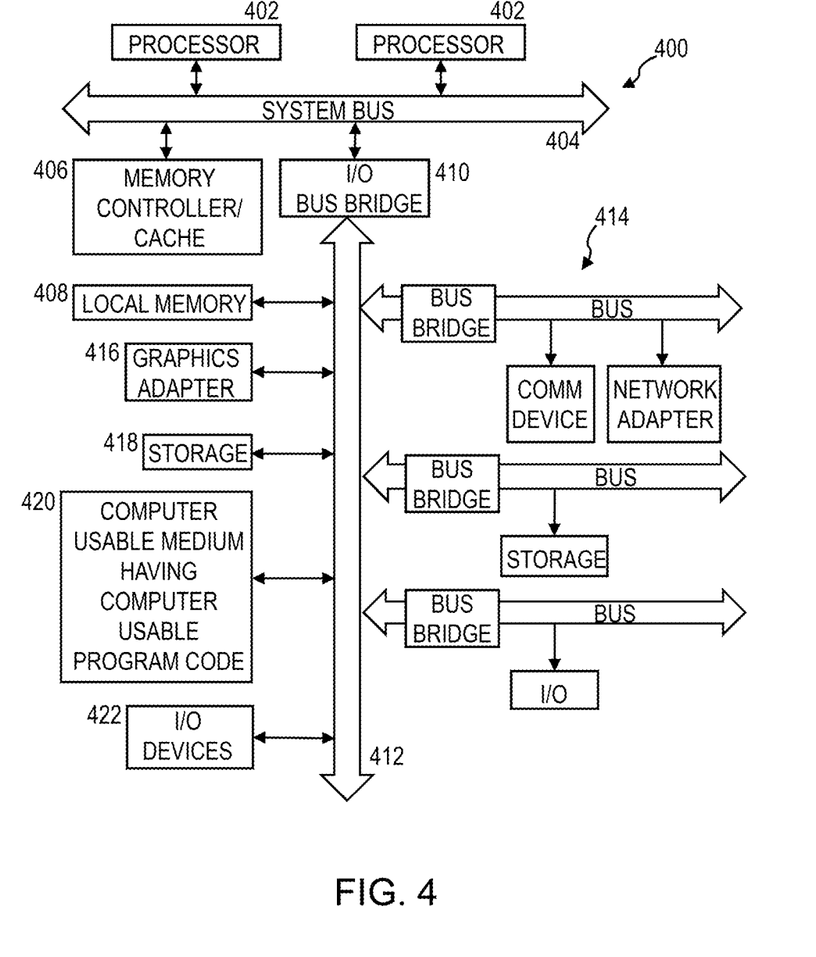
FIG. 4 depicts a block diagram of a data processing system in accordance with the present disclosure.

Referring to FIG. 4, a block diagram of a data processing system is depicted in accordance with the present disclosure. A data processing system 400, such as may be utilized to implement the hardware platform 102 or aspects thereof such as the UIQM 116, e.g., as set out in greater detail in FIG. 1, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving, by a processor, a plurality of user interaction events during a user interaction window, wherein each of the user interaction events comprises one of a low quality voice transcription event from a speech-to-text (STT) service or a no-intent matching event from a natural language processing (NLP) service;
   receiving, by the processor, a respective transcription confidence score from the STT service for each of the plurality of user interaction events;
   for a one of the plurality of user interaction events, determining, by the processor, how to respond to a user providing the user interaction events based on how many events comprise the plurality of events and the transcription confidence score for the one event; and
   providing, by the processor, instructions to cause the determined response to be presented to the user in accordance with the determination of how to respond.

2. The computer-implemented method of claim 1, wherein the determination of how to respond comprises:
   during the user interaction window, providing, by the processor, a callback to the user.

3. The computer-implemented method of claim 1, further comprising:
   determining, by the processor, an average word count for the plurality of user interaction events, wherein the determination of how to respond is based, at least in part, on the average word count.

4. The computer-implemented method of claim 1, wherein a low-quality voice transcription event comprises a respective confidence value of less than 0.1.

5. The computer-implemented method of claim 1, further comprising:
   determining, by the processor, that multiple conversations are occurring in an environment of the user.

6. The computer-implemented method of claim 1, further comprising:
   determining, by the processor, that a volume at which the user is speaking is causing one or more of the plurality of user interaction events.

7. The computer-implemented method of claim 1, further comprising:
   receiving a late user interaction event occurring after the user interaction window has ended; and
   wherein the determination of how to respond is based at least in part on the late user interaction event and one or more of the plurality of user interaction events.

8. The computer-implemented method of claim 1, wherein the determination of how to respond comprises:
   determining contextual help to include in a callback to the user.

9. The computer-implemented method of claim 1, wherein the determination of how to respond comprises:
   determining to delay a callback to the user; and
   determining a reason to delay the callback.

10. The computer-implemented method claim 9, further comprising:
    subsequent to an end of the user interaction window, providing, by the processor, the instructions to cause the callback and the reason to the user.

11. A system, comprising:
    a processor programmed to initiate executable operations comprising:
      receiving a plurality of user interaction events during a user interaction window, wherein each of the user interaction events comprises one of a low quality voice transcription event from a speech-to-text (STT) service or a no-intent matching event from a natural language processing (NLP) service;
      receiving a respective transcription confidence score from the STT service for each of the plurality of user interaction events;
      for a one of the plurality of user interaction events, determining how to respond to a user providing the user interaction events based on how many events comprise the plurality of events and the transcription confidence score for the one event; and
      providing instructions to cause the determined response to be presented to the user in accordance with the determination of how to respond.

12. The system of claim 11, wherein the determination of how to respond comprises:
    during the user interaction window, providing a callback to the user.

13. The system of claim 11, wherein the processor is programmed to initiate executable operations further comprising:
    determining an average word count for the plurality of user interaction events, wherein the determination of how to respond is based, at least in part, on the average word count.

14. The system of claim 11, wherein a low-quality voice transcription event comprises a respective confidence value of less than 0.1.

15. The system of claim 11, wherein the processor is programmed to initiate executable operations further comprising:
    determining that multiple conversations are occurring in an environment of the user.

16. The system of claim 11, wherein the processor is programmed to initiate executable operations further comprising:
    determining that a volume at which the user is speaking is causing one or more of the plurality of user interaction events.

17. The system of claim 11, wherein the processor is programmed to initiate executable operations further comprising:
    receiving a late user interaction event occurring after the user interaction window has ended; and
    wherein the determination of how to respond is based at least in part on the late user interaction event and one or more of the plurality of user interaction events.

18. The system of claim 11, wherein the determination of how to respond comprises:
    determining to delay a callback to the user; and
    determining a reason to delay the callback.

19. The system of claim 18, wherein the processor is programmed to initiate executable operations further comprising:
    subsequent to an end of the user interaction window, providing the instructions to cause the callback and the reason to the user.

20. A computer program product, comprising:
    a computer readable storage medium having program code stored thereon, the program code executable by a data processing system to initiate operations including:
        receiving, by the data processing system, a plurality of user interaction events during a user interaction window, wherein each of the user interaction events comprises one of a low quality voice transcription event from a speech-to-text (STT) service or a no-intent matching event from a natural language processing (NLP) service;
    receiving, by the data processing system, a respective transcription confidence score from the STT service for each of the plurality of user interaction events;
    for a one of the plurality of user interaction events, determining, by the data processing system, how to respond to a user providing the user interaction events based on how many events comprise the plurality of events and the transcription confidence score for the one event; and
    providing, by the data processing system, instructions to cause the determined response to be presented to the user in accordance with the determination of how to respond.

* * * * *